A. L. BERTHELSEN.
PULSATOR FOR MILKING MACHINES.
APPLICATION FILED FEB. 19, 1912.
1,043,040.
Patented Oct. 29, 1912.
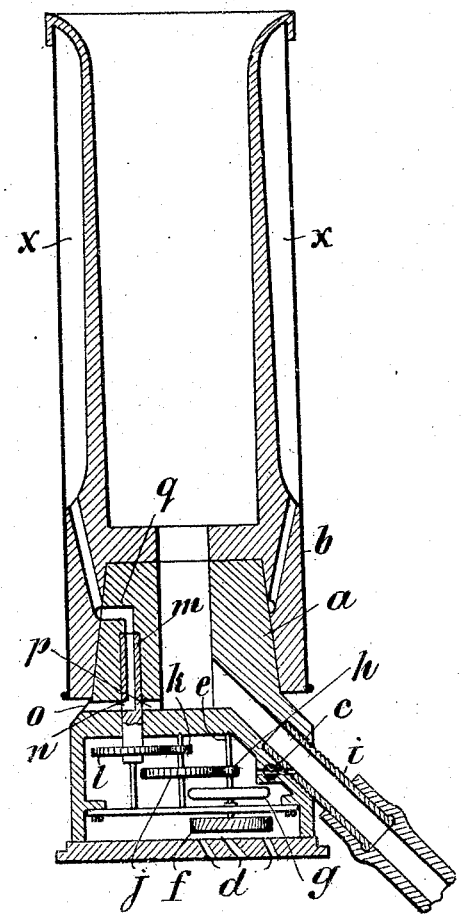
Witnesses
K. E. Klein.
L. B. Baker
Inventor
Anders Lassen Berthelsen.
by
Attorneys.

UNITED STATES PATENT OFFICE.

ANDERS LASSEN BERTHELSEN, OF BRÆDSTRUP, DENMARK, ASSIGNOR TO F. A HENNINGSEN, OF BUTTE, MONTANA.

PULSATOR FOR MILKING-MACHINES.

1,043,040.

Specification of Letters Patent. Patented Oct. 29, 1912.

Application filed February 19, 1912. Serial No. 678,665.

*To all whom it may concern:*

Be it known that I, ANDERS LASSEN BERTHELSEN, a subject of the King of Denmark, residing at Brædstrup, Denmark, have invented certain new and useful Improvements in Pulsators for Milking-Machines, of which the following is a full, clear, and exact description.

The invention relates to a pulsator for milking machines in which the milking cup consists of an elastic casing arranged in a firm casing.

The drawing shows a sectional view of an embodiment of the invention.

Under the milking cup proper is arranged the cast mouth-piece $a$ of the pulsator, into one side of which mouth-piece is screwed a tube $i$ which is in connection with the vacuum reservoir, and through which the air is sucked through the channel $c$ from the holes $d$ in the bottom of the bottom-piece. On the shaft $e$ at its lower end is arranged a small air-turbine $f$ on the oblique wings of which acts the air current from the holes $d$, whereby the shaft $e$ is rotated at a great speed. In order to regulate the speed a flywheel $g$ is further arranged on the shaft. The shaft also carries a pinion $h$ meshing with the gear $j$, which latter by a pinion $k$ arranged on its shaft transmits the rotating movement to the wheel $l$, the upper shaft-end $m$ of which is bored out in its longitudinal direction so deeply as to make the valve-opening $n$ on one side of the shaft correspond to the valve-openings $o$ and $p$ in the mouth-piece $a$, which openings lead outward and to the interior of the milking-cup respectively. The cavity of the shaft $m$ is at top by means of the channel $q$ in connection with the space $x$ between the firm and the elastic wall of the milking-cup. When now the shaft $m$ is turning the valve-opening $n$, when in the position in register with the opening $o$, will cause the atmospheric air to be transmitted through the channel $q$ and further through a system of channels in the rubber-casing into the space $x$, where is thus exercised a pressure on the rubber-walls. After half a revolution the opening $n$ will be found in register with the hole $p$, so that in the space $x$ will now arise vacuum. The size of the channel $c$ may be altered by an adjusting valve.

Having now described my said invention and in what manner the same is to be performed what I claim and desire to secure by Letters Patent of U. S. America is:

1. In a milking machine, the combination with an inelastic casing, of an elastic casing mounted therein forming an annular chamber between said casings, a milkway adapted to connect the interior of the elastic casing with a vacuum reservoir, means for alternately connecting the annular chamber with the milkway and the atmosphere, whereby suction and atmospheric action are alternately communicated to the annular chamber, and means operated by the suction for operating said last-named means.

2. In a milking machine, the combination with an inelastic casing, of an elastic casing mounted therein forming an annular chamber between said casing, an apertured base for said casings communicating therewith, a milkway through said base extending to the interior of the elastic casing and adapted to connect the same with a vacuum reservoir, an air turbine mounted in the base and adapted to be operated by the air suction therethrough, a rotary valve mounted in a passage through said base, and connections between said valve and said air turbine whereby the former is caused to be rotated to successively open and close communication between the milkway and the annular chamber between the casings and between said chamber and the atmosphere, for the purpose set forth.

3. In a milking machine, the combination with an inelastic casing, of an elastic casing mounted therein forming an annular chamber between said casings, an apertured base for said casings communicating therewith, a milkway through said base adapted to connect the interior of the elastic casing with a vacuum reservoir, a series of shafts mounted in the base, apertures in the base through which air is drawn, an air-turbine, and a flywheel mounted upon one of the shafts, means for communicating motion from said first-named shaft to the other shafts of the series, one of said shafts extending through the upper portion of the base and bored through a portion of its length, a valved connection between the interior of the base and the milkway whereby the suction through said milkway causes air entering the base to actuate the turbine carrying shaft and through the gear connections the remaining shafts, whereby the bored shaft is caused in its revolutions to successively open and close communication between the milkway and the annular chamber between the casing and between said chamber and the atmosphere, for the purpose set forth.

In witness whereof, I have subscribed my signature, in the presence of two witnesses.

ANDERS LASSEN BERTHELSEN.

Witnesses:
VIGGO BLOM,
G. DAMGAARD.